UNITED STATES PATENT OFFICE.

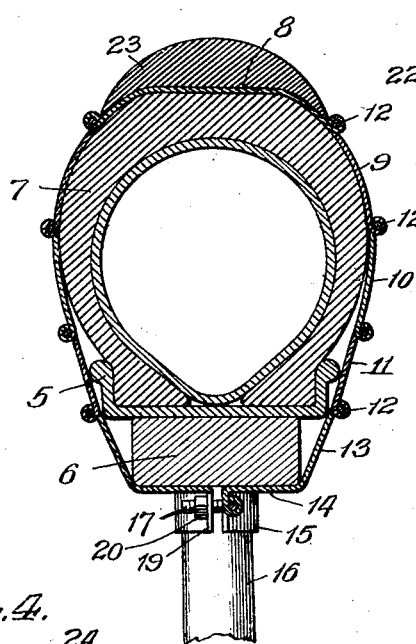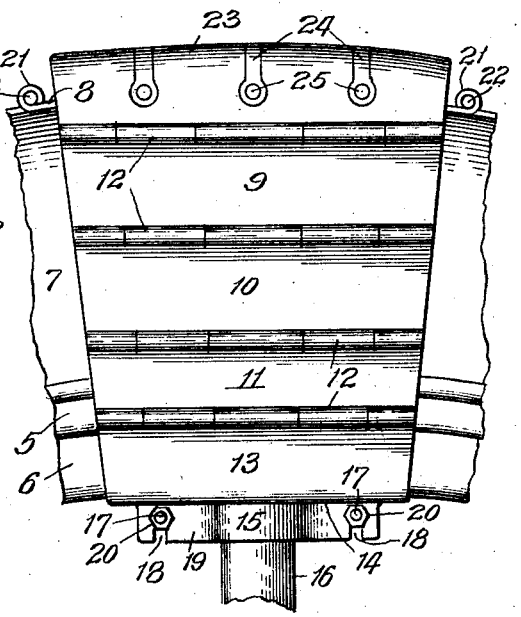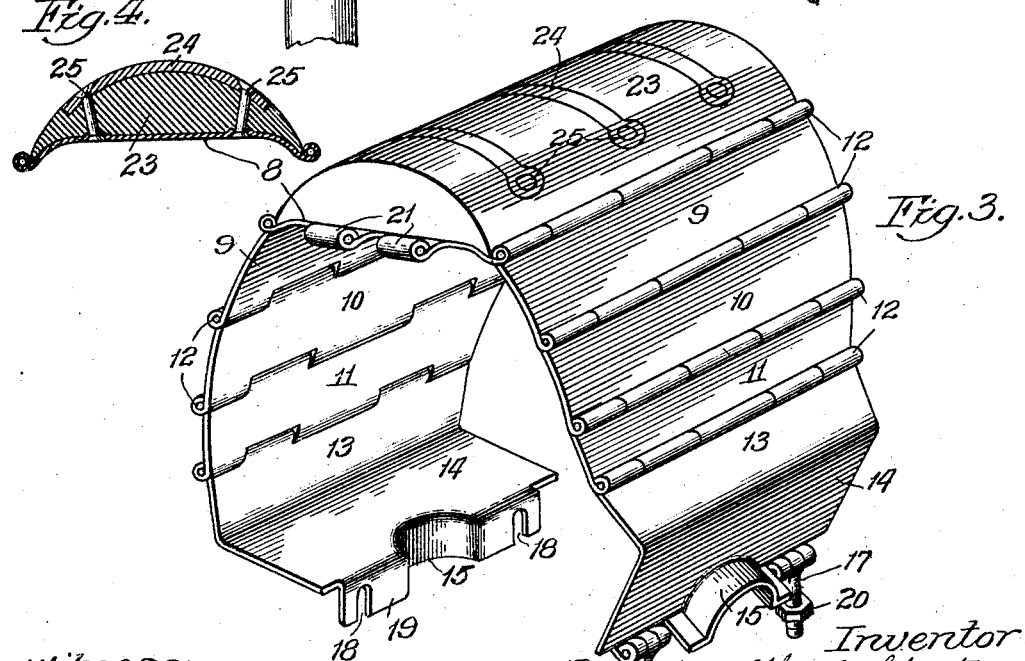

ALBERT G. SCHROETER, OF SOUTH CHICAGO, ILLINOIS.

PNEUMATIC-TIRE PROTECTOR.

1,408,832.  Specification of Letters Patent.  Patented Mar. 7, 1922.

Application filed December 15, 1919. Serial No. 344,929.

*To all whom it may concern:*

Be it known that I, ALBERT G. SCHROETER, a citizen of the United States, a resident of South Chicago, in the county of Cook and State of Illinois, have invented certain new and useful Improvements in Pneumatic-Tire Protectors, of which the following is a full, clear, and exact description.

The invention relates to pneumatic tire protectors.

The object of the invention is to provide an improved tire protector which is efficient in use.

The invention consists in the several novel features hereinafter set forth and more particularly defined by claims at the conclusion hereof.

In the drawings: Fig. 1 is a cross section of a pneumatic tire having the invention applied thereto. Fig. 2 is a side elevation. Fig. 3 is a perspective view of one of the sections of the protector separated from the tire. Fig. 4 is a cross section through one of the tread-members of the protector.

The invention is shown as applied to a wheel comprising spokes 16, a felloe 6, a rim 5 and a pneumatic tire 7, of usual construction, seated in the rim.

The improved protector consists of an annular series of sections which are hinged together. These sections are alike in construction, so that a description of one will suffice for all. Each protector-section comprises a metallic tread-member 8, side-sections 9, 10 and 11, all pivotally connected to one another by hinges 12 respectively and angular members 13, each having a base-portion 14 adapted to underlie the rim and felloe and to extend substantially to the lateral center thereof. Members 13 are provided with flanges forming sectional sockets 15 to receive one of the spokes 16 of the wheel to secure the protector against creepage. The hinge-joints 12 between the members of a section permit them to be swung laterally into position around a tire rim and felloe and to be removed therefrom. These base-portions are detachably secured and drawn together to secure the protector around the tire and rim by bolt 17 which are hinged to the inner end of one base portion 14 and are adapted to swing into slots 18 in the downturned flanges 19 on the other base-portion of a section. Nuts 20 are provided to effect this clamping of the section on the wheel.

All of the members of the section are preferably formed of sheet metal. At each end of a tread-section, there is formed an eye 21 to form, in connection with a pin 22, a pivotal connection between contiguous protector sections.

An elastic member 23 extends over the outer periphery of the tread section and is secured thereto by plates 24 in the outer periphery of the elastic member and rivets 25 which extend through said plates, elastic member, and the tread plate 8, as shown in Fig. 4.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a protector for pneumatic tires, the combination of a series of sections pivoted to one another at their ends, the sections comprising tread-members, side-members and base-members, hinged connections between the base and side members and the side members and the tread-members which permit relative pivotal movement of the sections, the base-members being formed to extend under the felly of the wheel, and having means to receive a wheel spoke, and means for securing the base-members together to secure the section on the wheel.

2. In a protector for pneumatic tires, the combination of a series of sections pivoted to one another at their ends, the sections comprising trade-members, side-members and base-members, hinged connections between the base-members and the side members and the side-members and tread members to permit relative transverse pivotal movement, the base members being formed to extend under the felly of a wheel, means for securing the base-members together to secure the sections on the wheel, all of said members being formed of metal and elastic members secured to the tread-members.

3. In a tire protector, the combination of sections each comprising a metal tread member, side members and a base member connected together to extend around a tire, elastic members on the tread-members, transversely extending strips embedded in the tread-face of said elastic members, and rivets extending through the ends of said strips and said elastic and metal tread members.

ALBERT G. SCHROETER.